Dec. 16, 1952     J. H. MILLER, JR     2,621,980
HUBCAP REMOVING HANDLE
Filed April 29, 1948
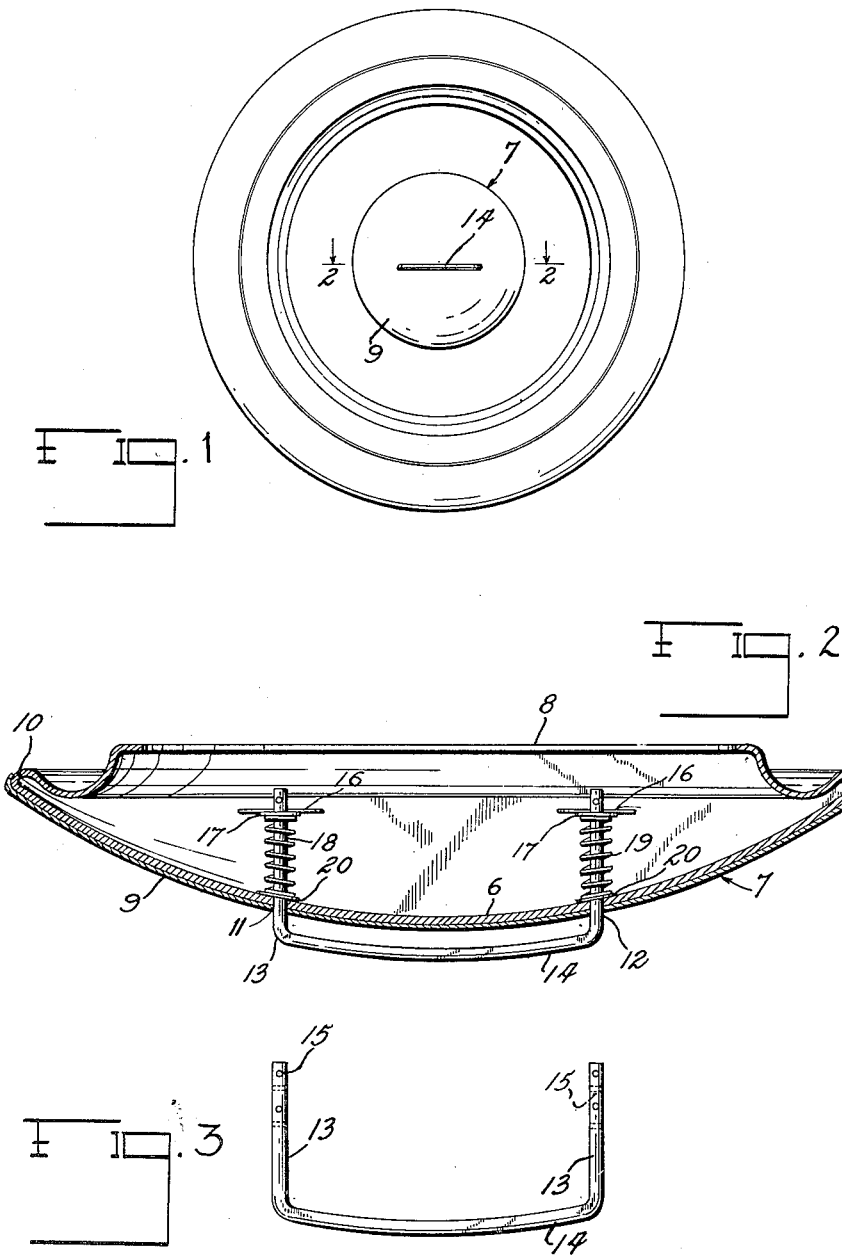
INVENTOR.
JOHN H. MILLER JR.
BY Joshua R. H. Potts
HIS ATTORNEY Patented Dec. 16, 1952

2,621,980

UNITED STATES PATENT OFFICE 2,621,980

HUBCAP REMOVING HANDLE

John H. Miller, Jr., Wyndmoor, Pa.

Application April 29, 1948, Serial No. 23,951

1 Claim. (Cl. 301—108)

This invention relates, in general, to hub caps and more particularly to simplified means for removing the hub caps of motor cars when desired.

The principal object of the invention is to provide improved means for removing the hub cap of an automobile, of comparatively simple design and inexpensive construction, and particularly adapted for attachment to conventional type hub caps without material change thereto.

Another object is the provision of an inconspicuous attachment to the hub caps of automobile wheels that may be quickly attached thereto and that will permit the convenient and expeditious removal of the hub caps without the use of an implement and without damage or marring of the finish thereof.

Another object is the provision of a simplified hub cap remover of pleasing design and which is susceptible of convenient manipulation, and adapted for installation on conventional type hub caps in a matter of minutes.

Other objects and advantages of the design and construction will appear more fully when taken in connection with the accompanying drawings wherein:

Figure 1 is a plan view of the outer side of a hub cap to which an embodiment of the invention has been operatively applied;

Figure 2 is an enlarged transverse sectional view, partly in elevation, taken on the line and as viewed in the direction of the arrows 2—2 of Figure 1; and Figure 3 is an elevational detail view of the adjustable bail or handle member of the device.

The invention particularly contemplates a hub cap removing device of a type adapted to be secured to substantially all conventional type hub caps of automobiles by merely boring or stamping out two small holes in the approximate center portion of the hub cap and then thrusting the spaced ends of the handle into the said holes and securing them resiliently in position by the springs and washers illustrated.

Heretofore, as far as I am aware, the means provided for facilitating the removal of hub caps have been of a nature that conflicted with the pleasing appearance of the hub cap as a whole, or which necessitated a complete departure from conventional design. These disadvantages are obviated by the present invention which is adapted for use with hub caps already in use on the car.

In the drawings wherein similar characters of reference indicate corresponding parts in the several views of the preferred form of the invention, the numeral 6 designates the inner shell of a conventional type, disk-shaped hub cap, designated generally at 7, and provided with a central opening, as at 8, to accommodate the hub (not shown) of a motor car wheel. Upon the outer periphery of the inner shell 6 an outer shell 9 of a suitable ferrous alloy is juxtaposed and secured to the beading thereof, as at 10. At opposite sides of approximately the center of the hub cap 6 two small holes are provided, as at 11, 12, which accommodate the opposite arms 13 of a U-shaped bail or handle member 14 with which the said arms are integrally formed.

Each arm 13 is provided with a series of holes 15 arranged in spaced relation and adapted to receive cotter pins 16 which serve as stops for a pair of washers 17 slidably mounted on the said arms. A pair of compression springs 18, 19 arranged on the arms 13 and confined between the washers 17 and a pair of additional washers 20 juxtaposed against the inner surface of the shell 6, normally maintain the handle in contact with the outer surface of the shell 9.

As best shown in Figure 2, it will be seen that the handle is adapted to be withdrawn from contact with the surface of the cap and against the urge of the springs. By placing the cotter pins in different holes, the urge of the springs may be increased or decreased. This adjustability of tension with respect to the handle permits the latter to be retained in position with any desired tension within the limits of that afforded by the springs.

The function and mode of operation of the device has been, in large measure, indicated above but may be summarized as follows:

With the hub cap in position on the hub of the wheel, in normal operation the center portion of the handle will be retained yieldingly against the face of the outer shell of the hub cap. When it is desired to remove the hub cap for any purpose, as in changing a tire, the handle is grasped by the hand and withdrawn to a point where the tension is sufficient to pull the cap from the hub of the wheel. Upon releasing the handle the latter will be urged into normal contact with the surface of the outer shell.

The position of the handle at the center of the hub cap and its relatively small size is such as to adapt it to blend harmoniously with the contour of the cap so that it may be applied to practically all conventional types of hub caps in a few minutes time. The attachment then serves to facilitate removal of the cap and prevents marring of its finish by eliminating the use of screw drivers and other implements when changing tires.

It is to be understood that the invention may be embodiied in other specific forms without departing from the spirit or essential attributes thereof, and it is, therefore, desired that the present embodiment be considered in all respects as illustrative and not restrictive, reference being had to the appended claim rather than to the foregoing description to indicate the scope of the invention.

What is claimed is:

The combination with the body portion of a hub cap, of manually operable means reciprocatingly arranged on said hub cap and substantially symmetical with respect to the center thereof, said means including a handle, a pair of arms fast to said handle and having a series of spaced holes, a pair of washers slidably mounted on each of said arms, a spring arranged between each pair of washers, and means selectively mounted in said holes to retain said washers against movement on the arms in excess of predetermined limits.

JOHN H. MILLER, Jr.

REFERENCES CITED

The following references are of record in the file of this patent:

UNITED STATES PATENTS

| Number | Name | Date |
|---|---|---|
| 1,074,133 | Neustaedter | Sept. 30, 1913 |
| 1,268,124 | Jennings | June 4, 1918 |
| 1,340,581 | Van Brunt | May 18, 1920 |
| 1,472,707 | Weisz | Oct. 30, 1923 |
| 1,502,727 | Lavoie | July 29, 1924 |
| 1,766,366 | Welsh | June 24, 1930 |
| 1,980,646 | Vickerilla | Nov. 13, 1934 |
| 2,328,339 | Heath | Aug. 31, 1943 |